(12) United States Patent
Clarke et al.

(10) Patent No.: US 11,520,785 B2
(45) Date of Patent: Dec. 6, 2022

(54) QUERY CLASSIFICATION ALTERATION BASED ON USER INPUT

(71) Applicant: salesforce.com, inc., San Francisco, CA (US)

(72) Inventors: Elizabeth Clarke, San Francisco, CA (US); Alain Ducoulombier, Grenoble (FR); Swapnil Kulkarni, San Francisco, CA (US); Alexander Lovell, San Francisco, CA (US); Glenn Sorrentino, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 178 days.

(21) Appl. No.: 16/736,621

(22) Filed: Jan. 7, 2020

(65) Prior Publication Data

US 2021/0081415 A1 Mar. 18, 2021

Related U.S. Application Data

(60) Provisional application No. 62/902,365, filed on Sep. 18, 2019.

(51) Int. Cl.
*G06F 16/2453* (2019.01)
*G06F 16/242* (2019.01)
*G06F 16/23* (2019.01)

(52) U.S. Cl.
CPC ........ *G06F 16/24534* (2019.01); *G06F 16/23* (2019.01); *G06F 16/243* (2019.01)

(58) Field of Classification Search
CPC .. G06F 16/24534; G06F 16/243; G06F 16/23; G06F 16/2423
See application file for complete search history.

(56) References Cited

U.S. PATENT DOCUMENTS

| | | | |
|---|---|---|---|
| 9,471,666 B2 | 10/2016 | Singh et al. | |
| 10,152,508 B2 | 12/2018 | Weissman et al. | |
| 10,802,670 B2 | 10/2020 | Brette et al. | |

(Continued)

FOREIGN PATENT DOCUMENTS

WO 2018213530 11/2018

*Primary Examiner* — William B Partridge
*Assistant Examiner* — Aryan D Toughiry
(74) *Attorney, Agent, or Firm* — Kowert, Hood, Munyon, Rankin & Goetzel, P.C.

(57) ABSTRACT

Techniques are disclosed for classifying a user search query for a database system. In disclosed techniques, a computing system receives a user search query for the database system and determines, based on the user search query, a database query that is compatible with an interface of the database system to implement the user search query. In some embodiments, the computing system causes a query remediation interface to be presented to a user that entered the user search query. In some embodiments, the interface includes: a classification of the user search query that specifies attributes of the database query, and one or more elements selectable to alter the database query. The computing system receives, from the user via the query remediation interface, input for altering the database query and determines an updated database query based on the input. The computing system may access the database system using the updated database query.

20 Claims, 12 Drawing Sheets

(56) References Cited

U.S. PATENT DOCUMENTS

| | | | |
|---|---|---|---|
| 2009/0037830 A1* | 2/2009 | Kulkarni | G06F 9/454 715/764 |
| 2009/0097493 A1 | 4/2009 | Patil et al. | |
| 2010/0057694 A1* | 3/2010 | Kunjithapatham | G06F 16/70 707/E17.009 |
| 2010/0312782 A1* | 12/2010 | Li | G06F 16/9038 707/769 |
| 2015/0227268 A1* | 8/2015 | Rathod | G06F 8/61 715/739 |
| 2015/0324422 A1* | 11/2015 | Elder | G06F 16/951 707/722 |
| 2016/0070442 A1 | 3/2016 | Sorrentino et al. | |
| 2016/0125048 A1* | 5/2016 | Hamada | G06F 16/24578 707/734 |
| 2018/0032576 A1* | 2/2018 | Romero | G06F 16/24522 |
| 2018/0095964 A1* | 4/2018 | DeLuca | G06F 16/285 |
| 2018/0349932 A1 | 12/2018 | Lee et al. | |
| 2019/0079978 A1* | 3/2019 | Ali | G06F 16/24573 |
| 2019/0129589 A1 | 5/2019 | Ryan et al. | |
| 2019/0205465 A1 | 7/2019 | Kulkarni | |
| 2019/0205472 A1 | 7/2019 | Kulkarni | |
| 2019/0228095 A1* | 7/2019 | Ergun | G06F 16/951 |
| 2019/0236195 A1 | 8/2019 | Sutedjo-The et al. | |
| 2019/0266152 A1 | 8/2019 | Sorrentino et al. | |
| 2019/0340256 A1 | 11/2019 | Kulkarni | |
| 2020/0073953 A1 | 3/2020 | Kulkarni | |
| 2020/0097260 A1 | 3/2020 | Clarke et al. | |
| 2020/0097481 A1 | 3/2020 | Cosentino et al. | |
| 2020/0097560 A1 | 3/2020 | Kulkarni | |

* cited by examiner

```
┌─────────────────────────────────────────────────────────────┐
│  Cause presentation of a user interface having an input     │
│  field operable to receive, from a user, a search query     │
│  for a database                                             │
│                           610                               │
└─────────────────────────────────────────────────────────────┘
                              │
                              ▼
┌─────────────────────────────────────────────────────────────┐
│  Classify the search query as a keyword query or a          │
│  natural language query                                     │
│                           620                               │
│  ┌───────────────────────────────────────────────────────┐  │
│  │ Determine whether the search query includes one or    │  │
│  │ more terms that are within a specified vocabulary     │  │
│  │ indicative of a natural language query                │  │
│  │                        630                            │  │
│  └───────────────────────────────────────────────────────┘  │
│                              │                              │
│                              ▼                              │
│  ┌───────────────────────────────────────────────────────┐  │
│  │ Determine whether the search query includes one or    │  │
│  │ more terms that identify an object defined in a       │  │
│  │ schema of the database                                │  │
│  │                        640                            │  │
│  └───────────────────────────────────────────────────────┘  │
└─────────────────────────────────────────────────────────────┘
                              │
                              ▼
┌─────────────────────────────────────────────────────────────┐
│  In response to classifying the search query as a natural   │
│  language query, return query results determined by        │
│  identifying values stored in the database that correspond  │
│  to the object defined in the schema                        │
│                           650                               │
└─────────────────────────────────────────────────────────────┘
                              │
                              ▼
┌─────────────────────────────────────────────────────────────┐
│  In response to classifying the search query as a keyword   │
│  query, return query results determined by comparing terms  │
│  of the search query to values within records stored in     │
│  the database                                               │
│                           660                               │
└─────────────────────────────────────────────────────────────┘
```

*Fig. 6*

*Query Remediation Interface 760*

*Classification Component 810B*

*Input Field 162*

*Classification Component 810A*

🔍 Accounts for Ami

Here are new accounts owned by Ami Lin. Did you want to search for records containing the keywords "Ami's Accounts"?

| Account Name | Created Date | Shipping City | Account Owner |
|---|---|---|---|
| Vandelay Industries | 9/28/2018 | Los Angeles | Ami Lin |
| New York Times | 9/13/2018 | Oakland | Ami Lin |
| Christian's Coffee | 9/30/2018 | Oakland | Ami Lin |
| Trailhead DX | 9/4/2018 | Mariposa | Ami Lin |

*Preview 218*

*Fig. 8A*

Query Remediation
Interface 760

Classification
Component
810B

Input Field
162

Classification
Component
810A

REFINE BY:

Accounts for Ami

Created Date

09/11/2019

Shipping City

Mariposa

Account Name

Account Owner

Ami Lin

Preview
218

*Fig. 8B*

QUERY CLASSIFICATION ALTERATION BASED ON USER INPUT

The present application claims priority to U.S. Prov. Appl. No. 62/902,365, filed Sep. 18, 2019, which is incorporated by reference herein in its entirety.

BACKGROUND

Technical Field

This disclosure relates generally to databases, and, more specifically, to database queries.

Description of the Related Art

As the amount of data available to users continues to grow, efficient searching of data remains of paramount importance. Many data stores have particular search formats—a database may receive searches formatted in the SQL database language, for example. These low-level formats may be unknown to many end users, however, and thus may not be useful in many instances. This is particularly true where users do not have visibility to the organization of the data store (e.g., the database schema). Accordingly, search efficiency may not be optimal for many users in some cases, resulting in repetitive searches in order to find relevant results.

BRIEF DESCRIPTION OF THE DRAWINGS

FIG. 6 is a flow diagram illustrating a method for returning query results for a search query entered by a user based on classifying the user search query, according to some embodiments.

FIGS. 8A-8C are block diagrams illustrating an example user interface that displays query results and a query classification, according to some embodiments.

Figure 1:
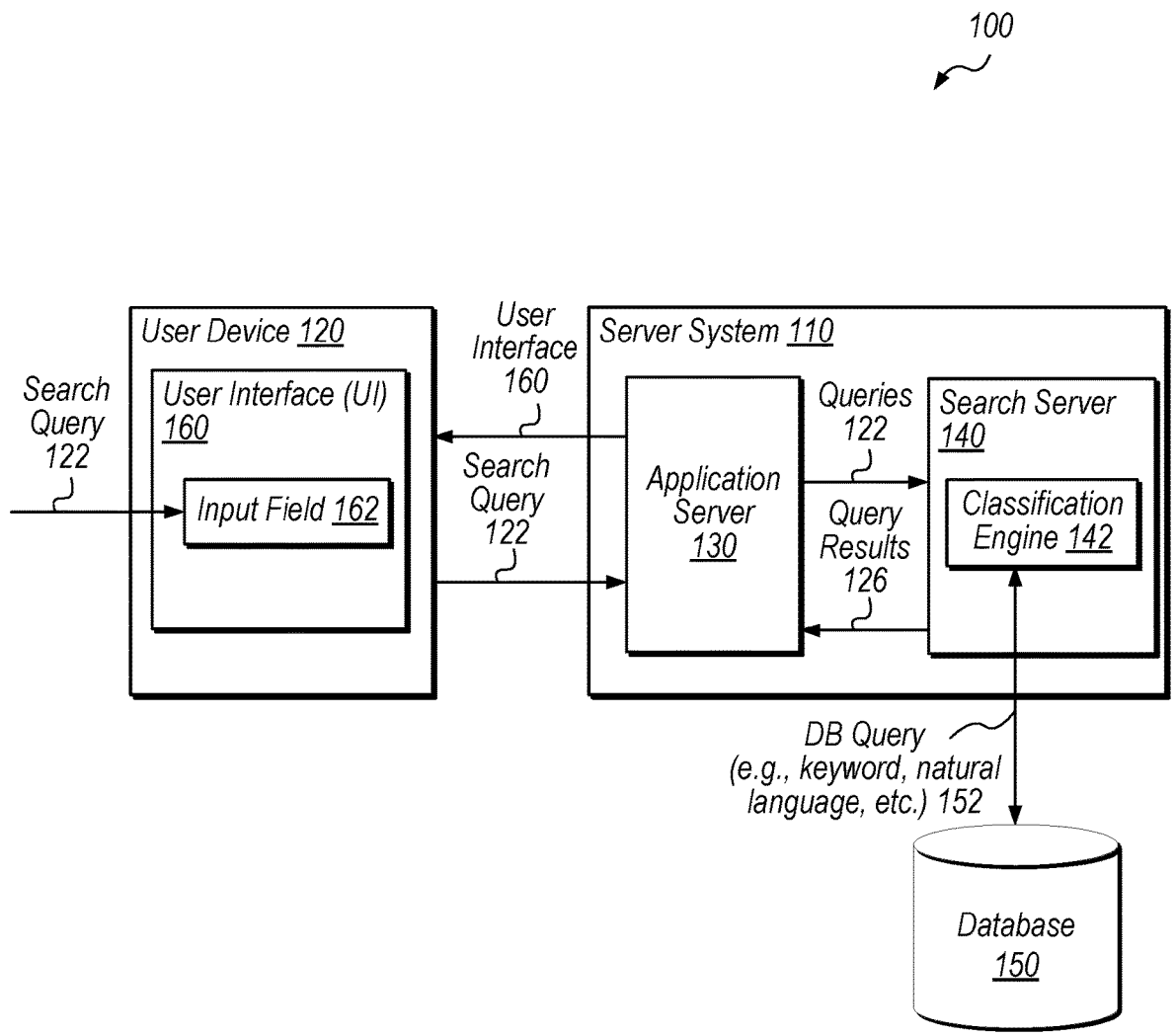
FIG. 1 is a block diagram illustrating a search system configured to classify a user-entered query and provide query results to the user based on the classification, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "search system configured to classify a user search query" is intended to cover, for example, a computer system having, for example, a processor, network interface, memory having program instructions, etc. to performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example. When used herein, the term "or" is used as an inclusive or and not as an exclusive or. For example, the phrase "at least one of x, y, or z" means any one of x, y, and z, as well as any combination thereof (e.g., x and y, but not z or x, y, and z).

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes embodiments that seek to improve the efficiency of search queries. First, a unified search interface is disclosed. This allows the user to enter a single search query, and the system determines which of a plurality of search modes will be utilized based on a variety of factors, including information both internal and external to the query. For example, this allows a search system to determine whether a query should be implemented as a natural language query or a keyword query. This first set of embodiments is described beginning with reference to FIG. 1. Second, various query remediation techniques are disclosed that provide the user with suggestions for a modified search query. These suggestions may be provided either with or instead of an original set of search results. This second set of embodiments is described beginning with reference to FIG. 7. Both embodiments may be used either separately or together in order to improve the user search experience.

Query Classification

Types of search queries include keyword queries and natural language queries. A natural language query is a query that is formulated in the manner in which a query would be formulated in everyday speech or writing. A keyword query, in contrast, is not formulated in such a manner, and thus may simply include certain isolated terms. Accordingly, the query "which U.S. state has the highest income tax" might be intended by the user as a natural language query, while "highest income tax state" might be intended by the user as a keyword query.

A given search query might be classified in different ways independent of actual user intent. Thus, the query "which U.S. state has the highest income tax" might be implemented using different types of techniques. One search system might be configured to process the query as a keyword query. Such a system might ignore the question mark and focus on certain terms in the query (e.g., "state," "income," and "tax") in order to return results. Another search system might be configured to process the query using natural language techniques. In this type of search system, a different set of search techniques may be used to understand the nature of the query and ideally return more relevant results to the user.

One broad aspect of the present disclosure is determining whether to implement a search query for a database using one of a plurality of different search techniques. This allows a user to enter a search query via a user interface without a requirement that the user explicitly pre-specify a classification of the query. As one example, the disclosed embodiments allow a particular query to be classified as either a natural language query or a keyword query.

The present inventors have recognized that various types of criteria may indicate that a particular one of a plurality of search techniques is to be implemented; this information may be within the query itself, or external to the query. For example, in some embodiments, a correspondence between terms in a query and a schema of the database may indicate that the query should be implemented as a natural language query rather than as a keyword query. In the former case, the query may be implemented by identifying values stored in the database that correspond to matching objects in the schema, while in the latter case, the query may be implemented by returning query results based on comparing terms of the search query to values within records stored in the database. Contextual information (i.e., information outside the query itself) may also influence the classification of a query. One example of contextual information is a particular user or organization's recent query classification history. This embodiment may advantageously permit more relevant search results to be returned without requiring a user entering the query to have an underlying knowledge of different search techniques or the schema of the database being searched.

FIG. 1 is a block diagram illustrating an embodiment of a search system 100 configured to classify a user search query and provide query results to the user based on the classification. As depicted, search system 100 includes a user device 120 in communication with a server system 110 to obtain results from database 150 for a search query 122 entered by a user via user interface 160.

Figure 2:
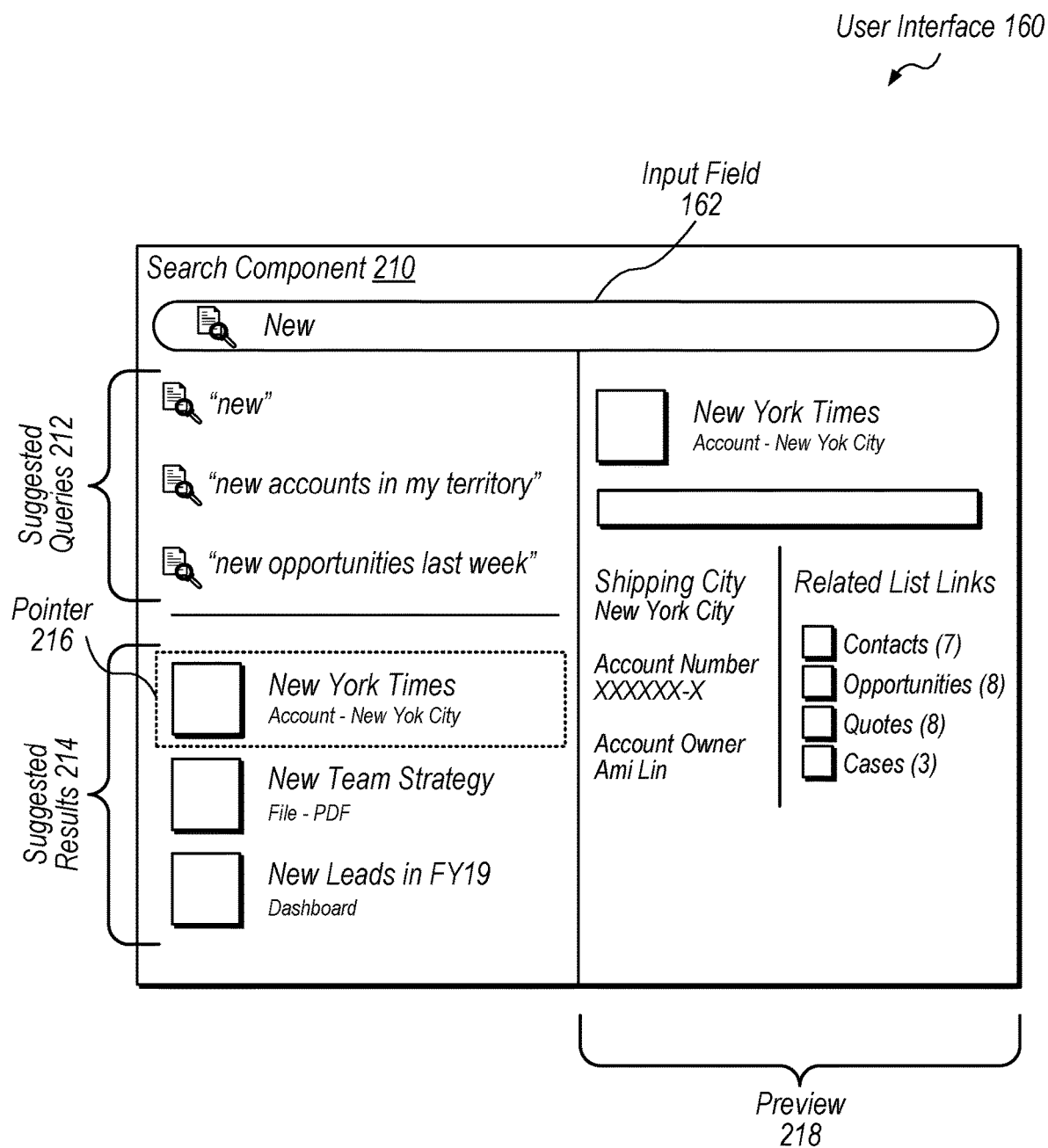
FIG. 2 is a block diagram illustrating an example user interface displaying query results for a user search query, according to some embodiments.

As depicted, server system 110 includes both an application server 130 and a search server 140 for handling interactions with client devices (e.g., user device 120). Application server 130 supplies a user interface (UI) 160 for display on user device 120. For example, application server 130 may deliver a web page to be rendered in a browser of user device 120. User device 120 may be any of various types of devices or systems and is not limited to a type of device capable of rendering a web page in a browser and that user device 120 may render user interface 160 using any of various methods. This web page, when rendered, may provide a user interface 160 to application server 130. User interface 160 includes an input field 162 that allows users to enter search queries 122. FIG. 2, discussed in detail below, provides an example of a portion of user interface 160.

User device 120, as shown, receives a search query 122 via input field 162 of user interface 160. Any type or format of search may be entered by a user here. For example, a user might enter "what are my open opportunities," or "my open opportunities," where "opportunities" refers to potential sales leads in a database. Further, a user might enter "Q4 sales North America 2018." Note that in the illustrated embodiment, the user is not required to indicate in advance how to query is to be classified (e.g., by checking a box indicating a natural language or keyword query). Input field 162 can thus be said to present a unified search interface for the user.

As depicted, user device 120 passes user search query 122 to the search server 140 via application server 130. In some embodiments, application server 130 generates an updated user interface 160 based on the user search query 122 and sends it to user device 120. For example, the updated user interface 160 may include one or more suggested user search queries for user selection as discussed below with reference to FIG. 2. Based on the user search queries 122, search server 140 accesses database 150 to provide query results to user device 120. Details regarding the structure and content of database 150 are discussed below with reference to FIG. 4. Note that, in some embodiments, database 150 may be included in a multi-tenant database system, in which various elements of hardware and software of the database system are shared by one or more tenants, but in which data for different tenants is securely stored such that other tenants cannot access the data, absent permission.

Because a goal of search system 100 is to return relevant results to users, different search techniques may be employed by search server 140 when formulating database queries 152 to database 150. It may be desirable, for example, to formulate database query 152 differently for a natural language query than for a keyword query. Further, certain database queries might focus on selecting objects within database 150, while other queries might focus on selecting records within objects that match keywords. For example, system 100 may classify the query "salesforce" as a keyword query and may generate a database query that is executable to retrieve various documents and/or records that include the word "salesforce." In contrast, system 100 may classify the query "my salesforce opportunities in San Francisco" as a natural language query and may generate a database query that is executable to retrieve various records within an "opportunities" table that are associated with the salesforce account of the user who input the search and that are located in "San Francisco."

Figure 3:
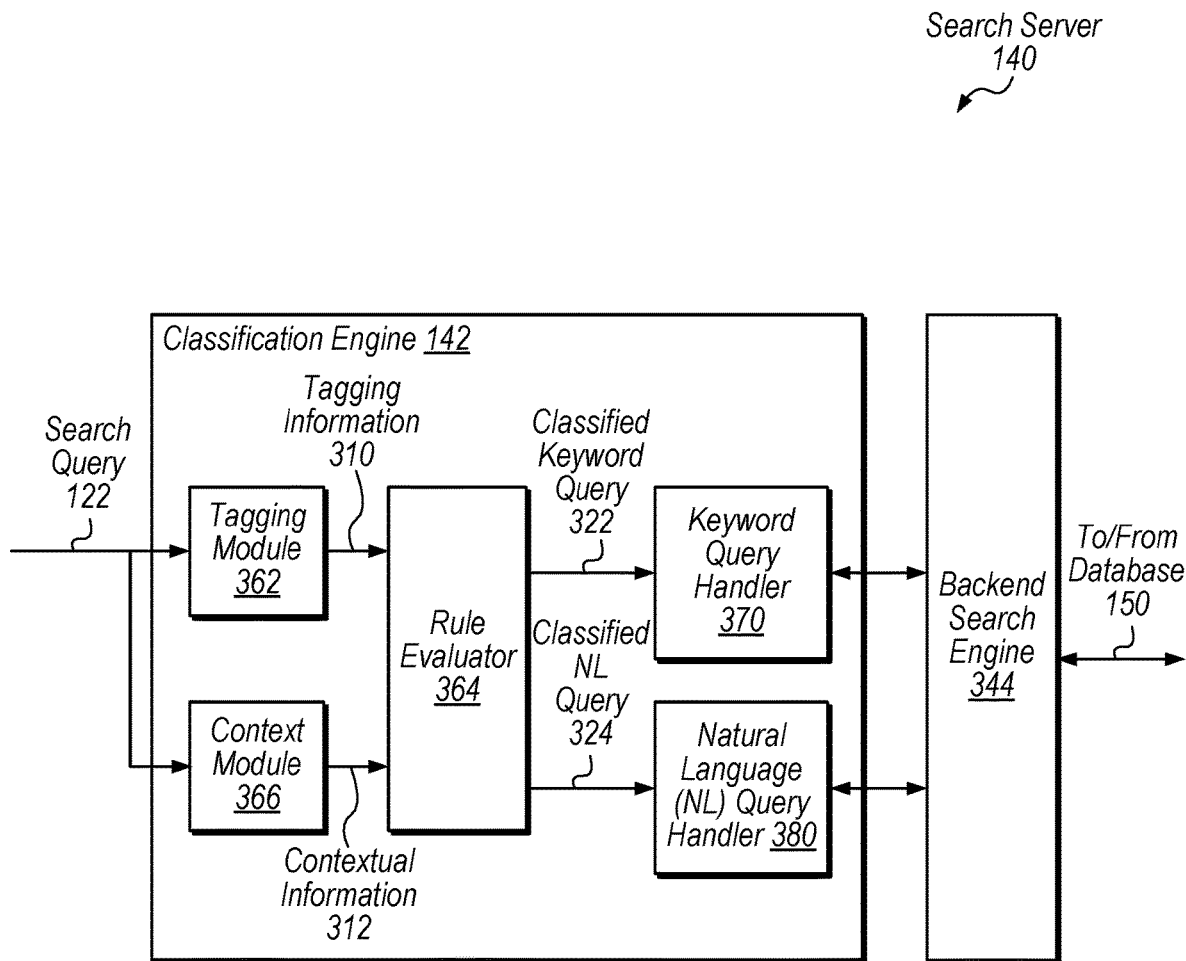
FIG. 3 is a block diagram illustrating example classification of an unknown user search query, according to some embodiments.

In the illustrated embodiment, classification engine 142 is used to classify search queries 122 in order to generate appropriate queries to database 150. In one embodiment, classification engine 142 executes to determine whether to implement a given query as a natural language or keyword query. Note that, in some embodiments, a natural language query may also be referred to as a conceptual query. As used herein, the term "engine" refers to a set of program instructions that are executable to perform one or more operations. FIG. 3, discussed in detail below, illustrates an example classification engine 142. Note that classification engine 142 may be separate from search server 100 and may be included in a query understanding server that classifies user search queries and communicates with the search server to implement a database query based on the classified user query.

Various criteria may be used by classification engine 142 to make a classification. In some embodiments, classification engine 142 "tags" (i.e., categorizes) one or more terms in a user search query 122. These tags may be part of a "vocabulary" for a particular search type (e.g., natural language). The vocabulary may, in various embodiments be standard for all users, standard within a particular set of users (e.g., an organization), or particular for each individual user. Additionally, the tags may be modifiers of a particular search query, such as a time, location, status, etc. Classification engine 142 may also determine whether query terms match a schema of a database, which, as noted, may indicate that a particular query be classified as a natural language query. Further, classification engine 142 may look at information external to the search query in terms of making a classification decision to provide context for the classification decision. As used herein, the term "schema" is used to refer to information that describes the organization of a database. A schema may be defined using a formal language and can provide a blueprint for how the database is constructed. For example, the schema may specify various objects (e.g., tables) that are included in the database, as well as their relation to one another. The schema of a database thus refers to the organization of a database, but does not, for example, specify particular values of fields in an instance of the database.

For example, the query "my open opportunities" might be tagged as follows: "my" as a keyword, "open" as a modifier, and "opportunities" as a database object. Various query terms may be said to match an object (e.g., table, field, record, etc.) that is defined within the schema of a database. In some embodiments, the combination of tags for a given query may be evaluated to determine whether the query is a keyword query or a natural language query. For example, if two or more terms are tagged using the same type of tag, this may indicate a natural language query. In some embodiments, the location of a tagged term relative to other tagged terms indicates a natural language query.

In some embodiments, one or more of the tags for the query "my open opportunities" are determined to have a relationship with the underlying database and, therefore, this query is identified as a natural language query. For example, if the term "open" is tagged as a modifier of the query and "opportunities" is tagged as a table of the database, a relationship between the tags and the underlying database may be based on a record within the opportunities table that has the field value "open." In contrast, if a number of tagged terms in a query do not meet a threshold number, the query may be classified as a keyword query. In various embodiments, contextual information such as prior classifications of a particular user's search may also inform the classification decision of classification engine 142. These techniques may advantageously lead to returning more relevant results to users, without requiring users to explicitly classify a search or to have an underlying knowledge of an organization of the corpus of data being searched.

Example User Interface

FIG. 2 is a block diagram illustrating an example user interface 160 displaying query results based on a classification of a user search query. In the illustrated embodiment, user interface 160 includes a search component 210, with input field 162, and displays suggested queries 212, suggested results 214, and a preview 218 showing details for a given query result.

The user interface 160 illustrated in FIG. 2 includes a unified search interface receiving a given search query. As noted, a classification engine such as 142 will determine search modes for queries entered via input field 162. Notably, user interface 160 does not require a user to pre-classify the type of search that is to be implemented in response to the query. Rather, the user simply enters a query into input field 162, and a classification engine 142 determines how the search will be implemented (e.g., as a keyword query or natural language query).

User interface 160 may have various features in different embodiments. In the illustrated example, a user enters the term "new" into input field 162. Based on this term, user interface 160 displays one or more suggested queries 212. In this example, the user may not be finished entering their query, but the system suggests results as the user is typing their search query. In some embodiments, the suggested queries are generated based on information associated with the user entering the query. For example, the suggested query "new accounts in my territory" may be generated based on the user having previously entered this search. As another example, a query may be suggested based on user attributes, such as a geographical location of the user or an organization with which the user is associated.

Suggested results 214, in the illustrated embodiment, are also displayed in user interface 160. For example, content related to the account "New York Times" may be suggested to the user based on the entered term "New." In the illustrated example, based on the user positioning their mouse pointer 216 over the "New York Times" suggested result, the user interface displays more detailed information for this account via the preview portion 218 of search component 210. Note that application server 130 generates various user interface components (e.g., component 210 or preview 218) and provides them to be rendered based on user interaction with user interface 160. Note that suggested queries 212 and suggested results 214 may both include selectable interface elements.

Query Identification

FIG. 3 is a block diagram illustrating example classification of an unknown user search query. In the illustrated embodiment, search server 140 includes a classification engine 142 that classifies a user search query and interfaces with a backend search engine 344 to perform a database query based on the query classification.

Classification engine 142, in the illustrated embodiment, receives a user search query 122 entered by a user via input field 162 and provides the query to tagging module 362 and context module 366. (Tagging module 362, context module 366, and rule evaluator module 364 are software modules discussed in detail below with reference to FIGS. 4 and 5.) Tagging module 362 generates tagging information 310 (or identifies terms that are to be tagged) for one or more terms of the search query 122. Tagging information 310 may include one or more tags for query terms, such as a vocabulary tag (e.g., the term is a pronoun such as "my"), an object tag (e.g., the term is defined in the schema of a database), a modifier tag (e.g., the term is a date range), etc. Tagging information 310 may also include one or more query terms corresponding to one or more tags. In some embodiments, tagging module 362 accesses database 150 to determine tagging information 310 for various query terms (e.g., to determine if the query terms match objects defined in the schema of the database). Alternately, tagging module 362 may store or have access to information external to database 150 that defines the schema, which may then be used for tagging purposes as discussed in further detail below with reference to FIG. 4.

As shown, classification engine 142 receives search query 122 and outputs the query to either keyword query handler 370 or natural language query handler 380, thus "classifying" the search. It is contemplated that classification engine 142 may classify a query into one of any number of possible search types in other embodiments. Search query 122 can include not only the search terms themselves, but also metadata about the query, including user identification, time, place, etc. The information in search query 122 is provided to tagging module 362 and context module 366.

Broadly speaking, the purpose of tagging module 362 is to tag or recognize terms in the search query 122. There are at least two possible bases for tagging terms that are contemplated. First, terms that match a vocabulary for the user (or some set of users that user is included in) may be tagged by tagging module 362. Second, query terms that match with a portion of a database schema may also be tagged. Thus, if a search query includes the term "opportunities" and the database being searched includes an object such as a table called "opportunities," the search term "opportunities" would be matched. Information about which terms are matched is then passed to rule evaluator module 364. In some embodiments, an administrator of the search system 100 assigns different tagging parameters to a particular user or a set of users within a particular organization and tagging module 362 then assigns tags to terms of a user search query based on these tagging parameters. For example, a system administrator may specify that one or more query terms, if entered by the particular user, be tagged according to a vocabulary that is specific to that user rather than tagging the terms as a schema-object match, even if the one or more query terms match an object defined in the schema of the database. In some embodiments, a system administrator indicates that a geographic location specified in a user search query must be tied to a particular field of a database table. For example, for the natural language query "my accounts in San Francisco," the system administrator may specify that "San Francisco" must be tied to the billing city field of the "accounts" table (e.g., rather than a shipping city field). In some embodiments, a system administrator may specify to exclude a particular term included in a user search query. For example, a system administrator may exclude a user search query term that specifies a location (e.g., "San Francisco") when generating a database query which, in turn, may broaden the search results returned for that query.

Context module 366 receives query metadata and either passes this information to rules evaluator module 364, or uses this query metadata to access contextual information. This contextual information is independent of (i.e., external to) the entered query, and may include information associated with the user that entered the query. For example, if the query metadata identifies a particular user that entered the query, this information might be used to obtain additional information about the user. For example, this information might include the user's role in a particular organization, information about the user's search history (including information about how past user searches have been classified and information about how the user has remediated past searches), information about other users that the searching user is linked to, etc. Broadly speaking, any information that is external to the query itself may constitute contextual information. As noted, this contextual information may be the query metadata itself or information that is accessed using the query metadata.

Figure 5:
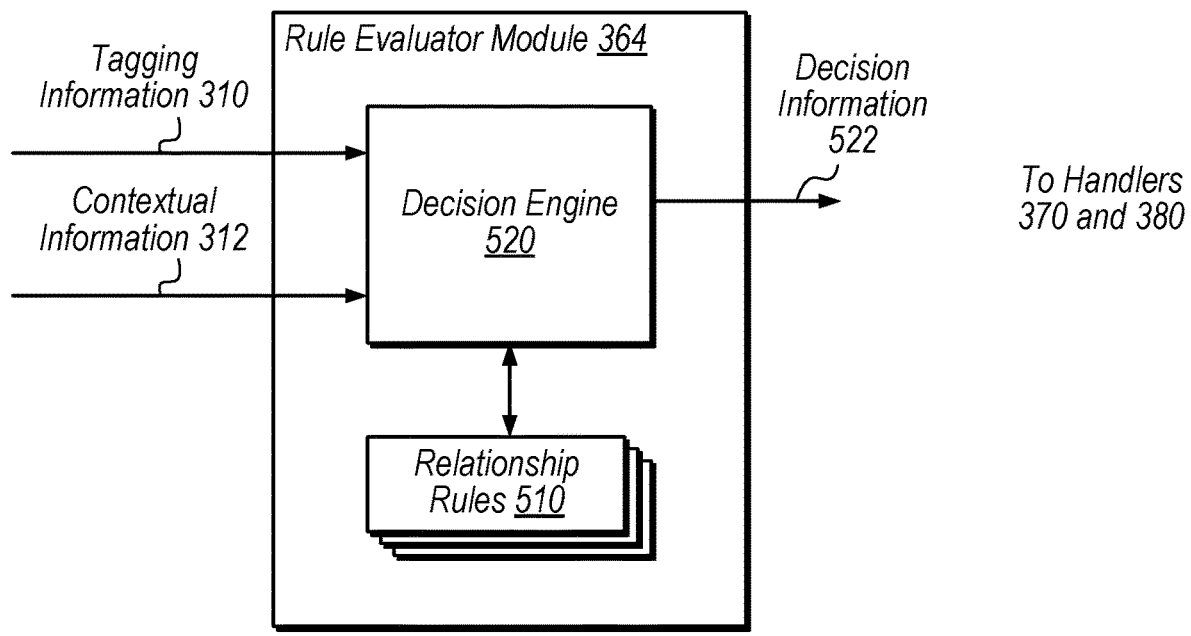
FIG. 5 is a block diagram illustrating an example rule evaluator module included in the classification engine for evaluating a query based on relationship rules, according to some embodiments.

Rules evaluator module 364 is described more with reference to FIG. 5, and in this embodiment is software that takes information from tagging module 362 regarding the terms that have been tagged, along with contextual information from context module 366 to apply a set of rules to classify search query 122.

Keyword query handler 370, in the illustrated example, translates a classified keyword query 322 into a database query and passes the translation to backend search engine 344. For example, keyword query handler 370 may provide a database query to backend search engine 344. Natural language query handler 380, in the illustrated example, translates a classified natural language query 324 into a database query and provides this translation to backend search engine 344.

Backend search engine 344, in the illustrated example, executes a database query for each identified query received from classification engine 142 and provides content from database 150 to classification engine 142. In some embodiments, backend search engine 344 uses different querying techniques for keyword query 322 than for natural language query 324.

Figure 4:
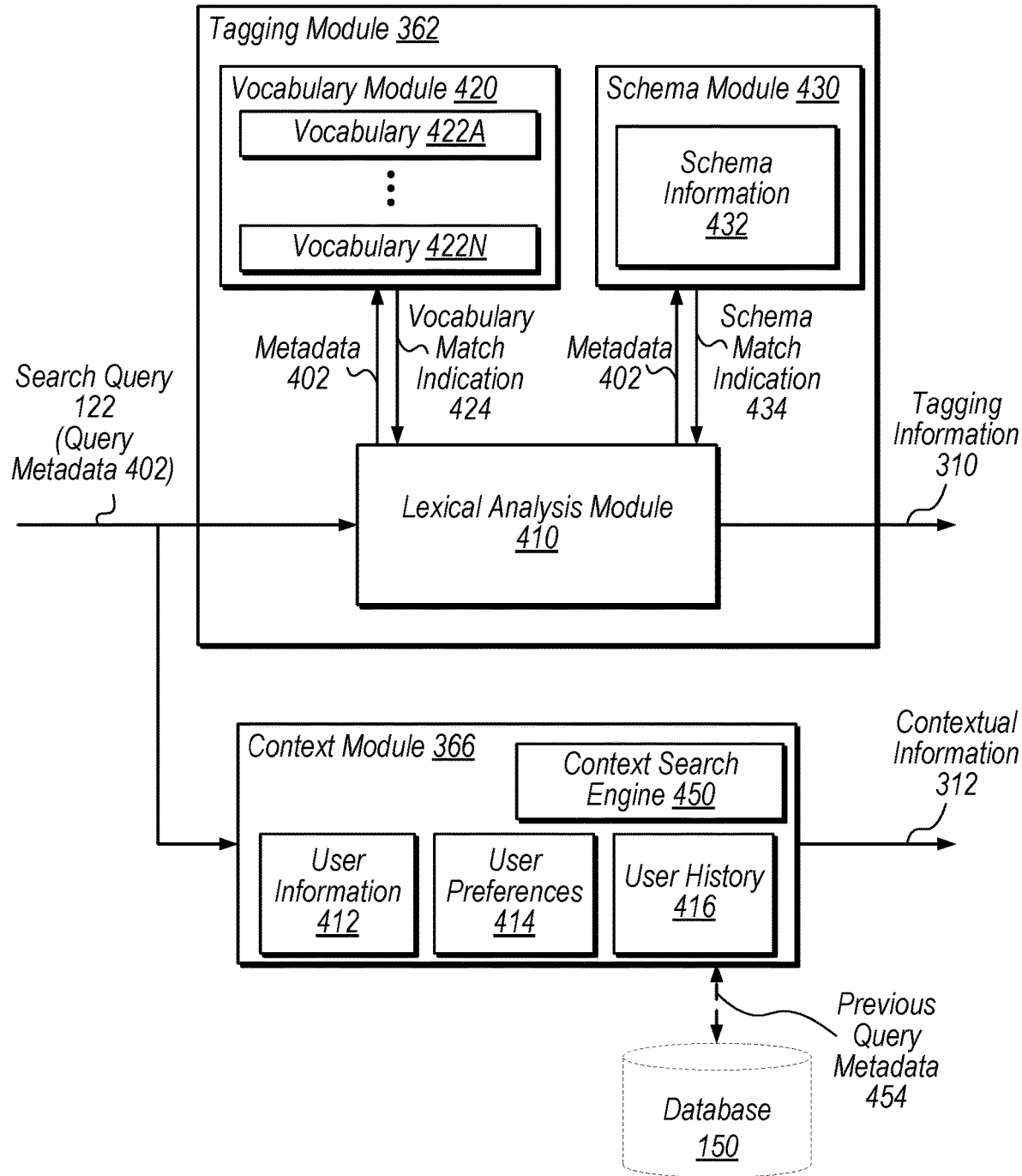
FIG. 4 is a block diagram illustrating an example tagging module and context module that are included in classification engine, according to some embodiments.

FIG. 4 is a block diagram illustrating an example tagging module 362 and context module 366 that are included in classification engine 142. In the illustrated embodiment, tagging module 362 generates tagging information 310 and context module 366 generates contextual information 312 for a search query 122 based on query metadata 402.

In some embodiments, tagging module 362 may include a lexical analysis module 410 that receives a search query 122 that includes query metadata 402 and sends the metadata 402 to vocabulary module 420. Query metadata 402 may include one or more query terms, a user identifier (ID), a timestamp, etc. associated with the search query 122. Vocabulary module 420 includes vocabularies 422A-422N of various terms that are indicative of a natural language query. In some embodiments, each vocabulary 422 is associated with a particular user or organization. For example, vocabulary 422A may contain a first set of terms that are different than a second set of terms included in vocabulary 422B and may be associated with a different user than vocabulary 422B. Note that a term that is within a specified vocabulary indicative of a natural language query may be referred to herein as a "keyword" that is indicative of a natural language query. Vocabulary module 420 compares the query metadata 402 (i.e., query terms) to one or more vocabularies 422 and determines whether there is a match. In some embodiments, vocabulary module 420 compares query terms to a particular vocabulary based on the user ID of the search query 122 being associated with the particular vocabulary. Based on determining a match, vocabulary module 420 sends a vocabulary match indication 424 to lexical analysis module 410.

Schema module 430 also receives metadata 402 from lexical analysis module 410 and determines whether the metadata 402 matches the schema information. Based on determining a match, schema module 430 sends schema match indication 434 to lexical analysis module 410. Schema information 432 may specify an organizational structure of a database queried by backend search engine 344, for example, and may define one or more objects included in the database. In some embodiments, tagging module 362 obtains schema information 432 directly from database 150. In some embodiments, tagging module is a named entity recognition (NER) model that receives search phrases and assigns a label to one or more words in the search phrases.

In the illustrated example, lexical analysis module 410 generates tagging information 310 and tagging module 362 provides this information to rule evaluator module 364. Lexical analysis module 410 may perform a tokenization process to generate a sequence of tokens from the query terms included in query metadata 402—in other words, each token may in some instances correspond to a distinct query term. Lexical analysis module 410 may evaluate the sequence of tokens based on a lexical grammar (which may in some instances be described using regular expressions) to identify different types of strings. Based on these evaluations, lexical analysis module 410 may determine tags (e.g., object tag, vocabulary tag, modifier tag, etc.) for one or more query terms included in the query metadata 402.

Using the natural language query example discussed above, the term "my" could be tagged as a keyword, "open" could be tagged as a modifier, and "opportunities" could be tagged as a database object. In this example, tagging module 362 determines an object (such as a table of sales opportunities) defined in the database schema that corresponds to "opportunities" and, therefore, tags this query term as an object. As another example, a user may enter the query "what are my hot leads in a 10-mile radius" into input field 162 via user interface 160. Tagging module 362, in this example, tags "my" as a keyword, "leads" as an object, "hot" as a first modifier, and "10-mile radius" as a second modifier. In this example, "leads" is tagged as an object based on schema information 432 specifying that a "leads" table (e.g., that lists sales leads) is defined in the database schema.

In some situations, tagging module 362 is unable to tag one or more terms included in a query. For example, tagging module 362 may determine that a query term 402 corresponds to a value of the database but does not correspond to an object and, as a result, may not tag the term. As another example, tagging module 362 may determine that a query term, included in metadata 402, corresponds to an object in the database 150, but the user who entered the search query 122 does not have access to that object (e.g., the user is not associated with a tenant that has access rights to the content stored in the object of the database) and, therefore, does not tag the query term. In this example, tagging module 362 might classify the search query 122 as a keyword query rather than a natural language query.

In some embodiments, values stored within database 150 are field values of one or more database records. Note that objects within database 150 differ from values in that they identify a given table, field, or record defined by a database schema rather than identifying a specific value within a table, field, or record. For example, a database object might be a table in database 150 that includes records for user accounts. As another example, a database object might be individual fields or records of an "accounts" table in the database. Fields of a database object may include, for example, account name, date created, geographical location, account owner, etc.

Context module 366 in the illustrated embodiment receives the search query 122 with query metadata 402. Note that in some cases, module 366 may receive metadata 402 without the terms of search query 122. As shown, context module 366 includes user information 412, user preferences 414, and a user history 416. User information 412 may include: user account information (e.g., account number, username, password, user ID, age of the account, etc.), an organization of the user, user access-level (e.g., is the user authorized to access certain information in the database), an occupation description, etc. User preferences 414 may include settings for a user interface, query classification, etc. that are specified by the user who entered search query 122. User history 416 may include information about prior user activity, such as search history, user interface selections, web pages viewed, prior user preferences, etc. In some embodiments, context module 366 accesses database 150 to obtain query metadata 454 for one or more previously classified user queries. The query metadata 454 may be for queries that are similar to search query 122 and were entered by the same or a different user than the user who entered search query 122 and may include one or more previously classified user search queries 122. Note that, while context module 366 is shown as having access to various information associated with one or more users, this information may be for various organizations.

Context search engine 450, in the illustrated embodiment, performs a search of the information included in context module 366 based on the query metadata 402 of the user search query 122. For example, context search engine 450 may identify portions of user information 412, user preferences 414, user history 416, previous query metadata 454, etc. that are relevant to or associated with the search query 122. Once it has obtained relevant information via context search engine 450, context module 366 determine contextual information 312 and provides this information to rule evaluator module 364. Contextual information 312 may include one or more of the following: prior activity of the user and attributes of the user, such as geographic location, job title, organization the user is associated with; accounts associated with the user; various information that is independent of the user search query, such as a time of day.

FIG. 5 is a block diagram illustrating an example rule evaluator module 364 included in the classification engine 142 for evaluating a search query 122 based on relationship rules 510. In the illustrated embodiment, rule evaluator module 364 includes a decision engine 520 to generate decision information (e.g., a query classification) for a user search query 122.

Decision engine 520, in the illustrated example, receives tagging information 310 and contextual information 312 from tagging module 362 and context module 366, respectively. Decision engine 520 classifies the search query 122 as a keyword or natural language query based on applying relationship rules 510 (e.g., comparing the tagging information 310 and the contextual information 312 with these rules). Decision engine 520 then generates decision information 522 for the search query 122 and sends this information to one of handlers 370 and 380.

In some embodiments, decision engine 520 includes logic for applying relationship rules 510 based on different combinations of information 310 and 312. As one example, if decision engine 520 receives one or more vocabulary (e.g. keyword) tags and one or more object tags (included in tagging information 310) for a user query, it may check the relationship rules 510 to determine whether this combination of terms indicates that the query should be implemented as a natural language query.

In some situations, decision engine weights portions of tagging information 310 and contextual information 312 when applying relationship rules 510. For example, decision engine 520 may assign a greater weight to an object tag included in tagging information 310 than a modifier tag. In this example, decision engine 520 may apply relationship rules 510 such that the greater weight assigned to the object tag may influence whether the user search query 122 is classified as a natural language query or a keyword query. In one example scenario, tagging information 310 indicates for the user query "open accounts" that the term "open" is tagged as a modifier and the term "accounts" is untagged and the contextual information 312 indicates that ninety percent of the queries previously entered by this user were classified as natural language queries. Continuing in this example, even though the tagging information indicates that the query should be implemented as a keyword query, decision engine 520 classifies the query as a natural language query due to the contextual information. This classification may be based on a particular one of rules 510, which may or may not involve weights. As yet another example, if one term in a query is tagged as an object, but no other terms are tagged by the classification engine 142, then the classification engine will evaluate the contextual information 312. In this example, if the contextual information indicates that the user prefers their queries to be implemented as keyword queries and the contextual information is weighted greater than the tagging information 310, then the system will classify the user query as a keyword query despite the object tag. As will be appreciated, many different possible rules could be used in different implementations.

Decision information 522, in the illustrated embodiment, is provided to either keyword query handler 370 or natural language query handler 380 depending on the classification (e.g., keyword or natural language) for the user search query 122. Decision information 522 indicates in some manner how search query 122 has been classified. Decision information 522 may further include a classification for the user query, the user query itself (e.g., one or more query terms), contextual information 312, tagging information 310, or any combination thereof.

Example Method

FIG. 6 is a flow diagram illustrating a method for returning query results for a search query enter by a user based on classifying the search query as a natural language query or keyword query, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 610, in the illustrated embodiment, a computing system causes presentation of a user interface having an input field operable to receive, from a user, a search query for a database.

At 620, the computing system classifies the search query is a keyword query or a natural language query. In some embodiments, the computing system evaluates the search query to determine whether to implement the query in a first mode or in a second mode and implements the query in the determined mode. In some embodiments, based on determining whether to implement the query in the first mode of second mode, the computing system generates a classification of the query that specifies a set of database search terms that are compatible with an interface of the database. In some embodiments, the computing system causes display of query results and the classification of the query to the user, wherein the query results are generated by implementing the query in the determined mode. In some embodiments, in response to receiving user input indicating an alteration of the classification, the computing system implements the query using the altered classification. In some embodiments, the first mode implements the query as a natural language query and the second mode implements the query as a keyword query.

In some embodiments, the computing system maintains contextual information that is independent of the search query, where the classifying the search query is further based on the contextual information. In some embodiments, the contextual information includes, for the user, historical information indicating how previously entered queries have been classified. In some embodiments, the contextual information includes one or more attributes of the user, where the one or more attributes include a geographical location of the user. In some embodiments, the contextual information includes prior activity of the user.

At 630, as part of the classifying, the computing system determines whether the search query includes one or more terms that are within a specified vocabulary indicative of a natural language query. In some embodiments, the vocabulary includes one or more keywords and one or more regular expressions. In some embodiments, the vocabulary indicative of a natural language query is different for a first user than for a second user.

At 640, as part of the classifying, the computing system determines whether the search query includes one or more terms that identify an object defined in a schema of the database. In some embodiments, the object defined in the schema of the database is a table that includes one or more records. In some embodiments, the object defined in the schema of the database is a field (column) in a table of the database. In some embodiments, the computing system classifies the query entered by a first user as a keyword query and the same query entered subsequently by a second user as a natural language query, where the same query is classified differently for the first and second users based on a difference in contextual information stored for the first and second users.

In some embodiments, as part of the classifying, the computing system determines: a first score corresponding to whether one or more terms in the query match within the specified vocabulary, a second score corresponding to whether one or more terms in the query match within the schema of the database, and a third score corresponding to the contextual information, wherein the contextual information includes information about categorization of previous search queries from the user. In some embodiments, the computing system uses the first, second, and third scores to determine whether to implement the search query as a natural language query or a keyword query. In some embodiments, the first score and the second score are weighted based on the contextual information.

In some embodiments, in order to evaluate a search query, the computing system tags one or more terms according to a set of tagging criteria, where a first one of the tagging criteria specifies whether the query includes one or more terms that identify an object defined in a schema of the database. In some embodiments, a second one of the tagging criteria specifies whether the query includes one or more terms that are within a specified vocabulary indicative of a natural language query. In some embodiments, a third one of the tagging criteria specifies whether the query includes one or more terms that are recognized modifiers for other terms in the query. In some embodiments, the computing system implements the query as a keyword query in response to being unable to tag a threshold number of terms in the query.

In some embodiments, the computing system determines a first score for the term that is a keyword indicative of the first mode and a second score for the search term that identifies the object defined in the schema of the database. In some embodiments, the second score is based on a proximity within the query entered by the user of the term that is a keyword to the term that identifies the object.

At 650, in response to classifying the search query as a natural language query, the computing system returns query results determined by classifying values stored in the database that correspond to the object defined in the schema.

At 660, in response to classifying the received query as a keyword query, the computing system returns query results determined by comparing terms of the search query to values within records stored in the database.

Example Query Classification Alteration

In disclosed techniques, the search system may classify a user search query in situations where only a portion of the information necessary to query a database is expressed in the query or the information is expressed in a manner such that the backend search engine is unable to classify all or a portion of the information included in the query. As a result, in various situations, one or more portions of a query classification may be incorrect. For example, a user may enter a keyword query, but the search system may classify the query as a natural language query or vice versa. As another example, the search system may add a term or concept to a user search query, such as a date range, but the user intended to search based on a different date range (but did not explicitly include the date range in their search query). In disclosed techniques, an alteration engine handles user feedback for a classification 722 of a user search query 122, thereby allowing users to remediate the search query or a database query generated for the user search query e.g., when the user is dissatisfied with the query results or otherwise desires to change a query or obtain different results.

Disclosed remediation techniques may advantageously allow a user to obtain desired search results faster, which in turn may improve user interaction with a unified search system. For example, disclosed remediation techniques may allow a user to make a single selection to indicate to correct identified typographical errors, rather than entering a new search query to address the typographical errors. Similarly, disclosed remediation techniques may allow the user to specify one or more tags for query terms that the classification engine was unable to tag (e.g., the system could not identify these terms), which may advantageously prevent the situation where the user enters multiple different queries without obtaining desired search results. For example, instead of a user repeatedly guessing at and entering search queries to obtain desired results the server system 110 provides guidance in the form of remediation options which may advantageously improve the user's search experience. In some situations, remediation techniques may allow a user to provide alteration input for a database query generated by the server system 110 for a search query entered by the user.

Figure 7:
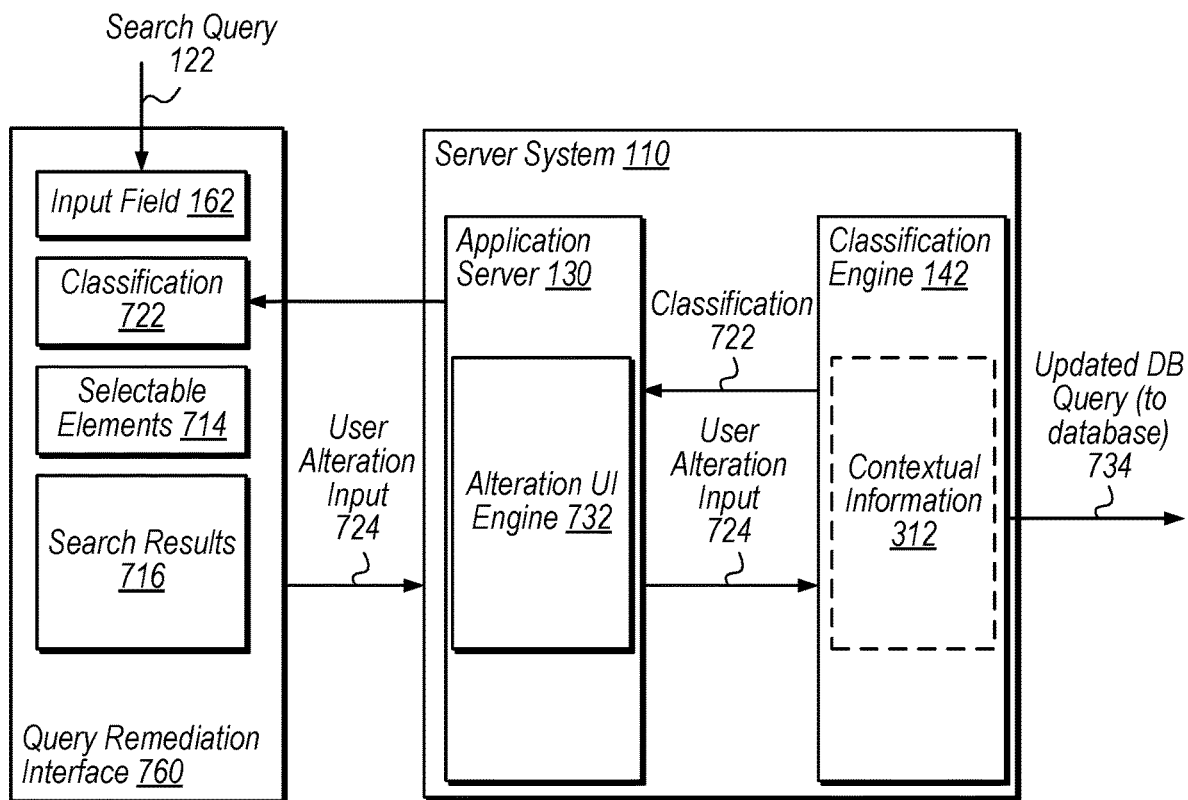
FIG. 7 is a block diagram illustrating an example search system configured to alter query results based on user-alteration of a presented query classification, according to some embodiments.

FIG. 7 is a block diagram illustrating an example search system 100 configured to alter query results based on user input to a query remediation interface 760. In some embodiments, query remediation interface 760 is included in user interface 160 (discussed above with reference to FIGS. 1 and 2). In the illustrated embodiment, server system 110 includes application server 130 with an alteration user interface (UI) engine 732 in communication with query remediation interface 760 to provide a query classification 722 based on contextual information 312 and receive user alteration input 724 of the classification.

Classification engine 142, in the illustrated embodiment, determines a classification 722 for a user search query 122. In some embodiments, the classification 722 of the user search query indicates that the user search query will be implemented as either a keyword or natural language query, for example, as discussed above. In some embodiments, the classification is determined based on contextual information 312, as discussed above with reference to FIG. 4. In some embodiments, the classification engine 142 infers one or more terms or concepts for a user search query and includes this information in query classification 722. As one example, classification engine 142 may infer that the user search query 122 "my day," pertains to the concept of the user's schedule and, accordingly provides information to the user about meetings or activities present on their schedule. As another example, classification engine 142 may add one or more terms to user search query 122 based on the geographic region of the user or based on prior user activity (e.g., sales) in that region. In some situations, however, the user who entered the search query 122 intended their search query to be interpreted differently (e.g., classification engine 142 classified one or more terms or concepts incorrectly). For example, a user may have meant for their query to be limited to a different geographic region than the region selected by classification engine 142. Alteration UI engine 732 provides remediation for such situations (e.g., when the user wants their search query to be implemented differently).

Query remediation interface 760, in the illustrated embodiment, displays the classification 722 of user search query 122 after receiving the classification from application server 130. Query remediation interface 760 may be rendered via various different devices or systems, including: a desktop computer, a laptop, a tablet, a wearable, a mobile phone, etc. In some embodiments, application server 130 includes a module for detecting what type of form factor or device will be displaying interface 760 and customizes interface 760 accordingly. In some embodiments, classification 722 includes a database query generated by server system 110 based on a classification of user search query 122. Query remediation interface 760 also displays selectable elements 714, in the illustrated embodiment, which may include one or more input elements, pop-up elements (such as a drop-down menu or an interface component), etc. A user selection may include, for example, user input to various input fields, a user mouse-over event, and a user selecting a user interface element, or any combination thereof. For example, if the user Christian Posse enters the search query 122 "Who is my next meeting with?" and classification engine 142 classifies this query as a natural language query, selectable elements 714 may include the following phrase:

"Here's information about your next meeting Christian. Did you mean to search for the keywords 'who is my next meeting with'?"

Various portions or terms included in this phrase may be selectable by the user to provide feedback for classification 722. Note that, in this example situation, the words "who is my next meeting with" are selectable by the user to request that the server system 110 perform the query as a keyword query instead of a natural language query. In other situations, selectable elements 714 include a database query with one or more portions that are selectable to alter the database query. For example, selectable elements may include the following SQL query:

SELECT   *   FROM   meetings   WHERE First_Name="Christian" AND Last_Name="Posse"

In this example, server system 110 has generated an SQL query that specifies to select one or more records from a "meetings" table that have a first name field with the value "Christian" and a last name field with the value "Posse." Further in this example, the user may select one or more portions of the database query to alter the database query (to generate updated database query 734).

In the illustrated embodiment, classification engine 142 sends an updated database query 734 to database 150, where this query is based on user alteration input 724 that is input via input field 162. Note that user alteration input 724 may specify to alter the user search query 122, the database query, or some combination thereof. Classification engine 142 stores information about user feedback (e.g., user alteration input 724) in state module 740. In some embodiments, classification engine 142 uses information stored in state module 740 to classify user search queries 122 going forward. For example, if classification engine 142 infers a date range for user search query 122 (that does not include a date range) and the user provides input 724 specifying that they do not want the date range included in their query, classification engine 142 may store this feedback in state module 740 and consider this for another query from the same user in future implementations.

Note that FIGS. 8B and 8C, discussed in detail below, include examples of selectable elements 714. In some embodiments, the selectable elements 714 are embedded in the displayed classification 722, such as the selectable phrase "who is my next meeting with?" in the example above. In other embodiments, the selectable elements 714 are shown separately from the classification 722 in a different user interface component, as shown in classification component 810B of FIG. 8B.

In some embodiments, selectable elements 714 may allow a user to alter one or more terms of a user search query 122 without altering the classification of the user search query by classification engine 142. For example, a classification 722 may allow the user to indicate that a subset of data used to return search results is incorrect (i.e., the user wants different data to be used to return search results). A user may alter or remediate classification 722 of a user search query by specifying to use additional terms for the database query. For example, the server system may classify the query "email for Christian" as a natural language query requesting the email for Christian Bale and may display search results 716 and a classification 722 accordingly. The user, however, may have intended to search for Christian Posse and alters the classification by entering "Christian Posse" into an account owner field of the displayed classification, such as the fields shown in FIG. 8C. As another example, selectable elements 714 may allow a user to correct one or more typographical errors in their search query 122. In some embodiments, classification 722 specifies one or more identified typographical errors and prompts the user to correct the identified errors. In some embodiments, classification 722 specifies that one or more typographical errors identified in a user search query were automatically corrected. In other embodiments, classification 722 specifies one or more changes that were made to a database query generated based on classification of a user search query.

In the illustrated embodiment, search results 716 for user search query 122 are also displayed in query remediation interface 760. In some embodiments, the search results 716 are selectable by the user to display additional information for the search results. FIG. 8A illustrates example search results 716 as well as a classification 722 for a user search query.

Alteration UI engine 732, in the illustrated embodiment, receives query classification 722 from classification engine 142 and renders the classification via query remediation interface 760. After receiving user feedback via query remediation interface 760, alteration UI engine 732 provides the user alteration input 726 to classification engine 142. Based on the user alteration input 726, classification engine 142 sends an updated database query 734 to backend search engine 344. Alteration UI engine 732 may then render query search results 716 for the updated database query 734 via query remediation interface 760. In some embodiments, alteration UI engine 732 generates an entirely new query remediation interface 760 based on the user alteration input 726. In some embodiments, for a given user search query, a user provides multiple rounds of input 726 to server system 110. For example, for each of three separate instances of user alteration input 726, server system 110 may generate a corresponding updated database query 734 and may provide new search results 716 accordingly.

Example User Interface for Query Classification Alteration

Figure 8C:
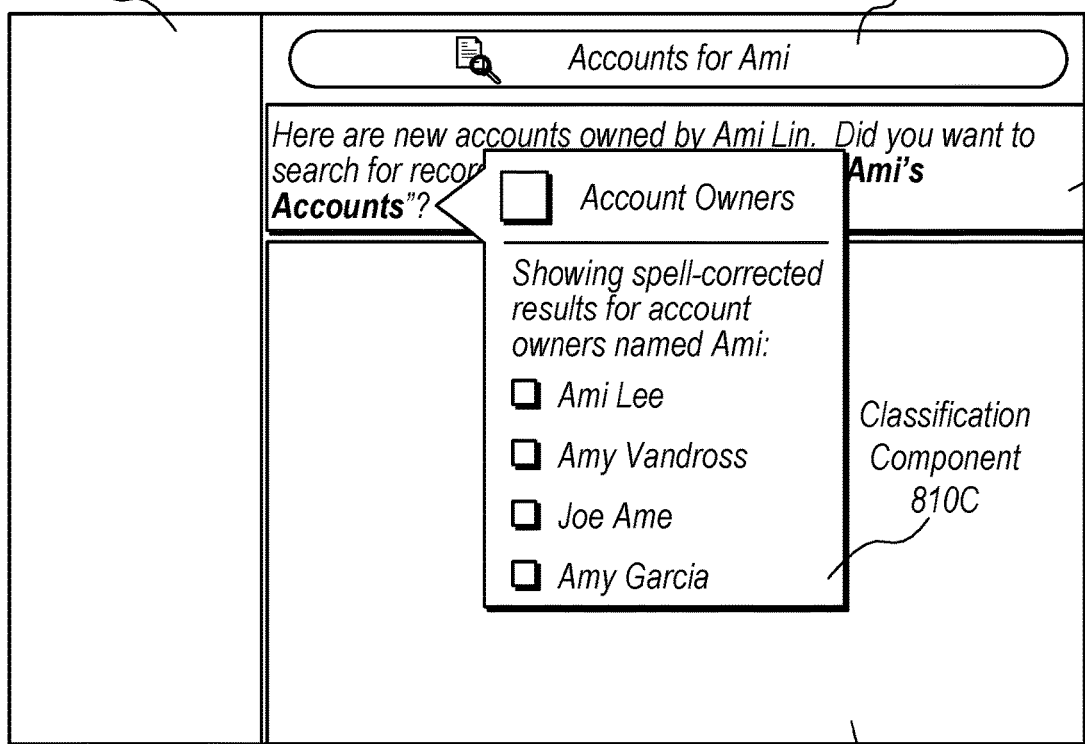

FIGS. 8A-8C are block diagrams illustrating an example user interface display that includes query results and a query classification. FIG. 8A illustrates an example query remediation interface 760 displaying two different classification components 810A and 810B and a preview 218 of search results. In the illustrated embodiment, input field 162 shows a user search query 122.

Classification component 810 displays a classification 722 of the search query 122 with the selectable element "Ami's Accounts" shown in bold. In some embodiments, this element is selectable by the user to change the query type identified by the classification system to a keyword query. In the illustrated embodiment, preview 218 shows four different search results for the search query 122 with values for four different fields. The search results are displayed based on the classification engine 142 adding the last name "Lin" to the search query 122. For example, the engine may determine that the query is intended for "Ami Lin" based on contextual information and may perform the search accordingly. In this example, however, if the user intended their search query to be for a different Ami, they may remediate the query using classification component 810A.

In some embodiments, classification component 810A includes information indicating that the term "accounts" in the user's search query was not tagged (e.g., not understood) by the system and allows the user to provide input for this term. For example, the user may specify to tag this term as an object of the underlying database (e.g., a record with a foreign key to an "accounts" table within the database). In some embodiments, classification component 810A displays a database query generated for search query 122. For example, the user may alter one or more elements of the database query displayed in classification component 810A.

In some embodiments, results displayed in preview 218 may be ranked based on various contextual information that is independent of the search query entered by the user. For example, ranking of query results may be based on the time of day a query is submitted (e.g., evaluate the most recently used search results for similar queries), previous searches entered by the user, previously selected query results, etc. In some embodiments, a "best result" is displayed at a top portion of preview 218 with more information than other displayed query results.

FIG. 8B illustrates classification component 810B showing selectable elements 714 for the user search query "Accounts for Ami." In the illustrated example, classification component 810B shows populated input for three of the input fields for refining the database query. In some embodiments, application server 130 generates classification component 810 with populated fields based on a determined best result for the user search query 122. For example, the classification system determines or guesses both a geographical location and an account owner for the user search query and displays this information in the appropriate field of the query remediation interface 760. In some embodiments, the user can remediate the information included in these fields. For example, the user may delete "Mariposa" as the shipping city and enter "San Francisco" instead, to restrict the search query "Accounts for Ami" to accounts with the shipping location "San Francisco."

FIG. 8C illustrates an additional selectable element 714 for a user search query 122. In the illustrated example, classification component 810C is a pop-up menu displayed based on the user positioning their selector (e.g., mouse) over "Ami's Accounts" displayed in classification component 810A. Once classification component 810C is displayed, the user can select a different account owner for their search query 122. For example, if the user selects Amy Vandross from the displayed list of account owners, server system 110 may perform a new query based on the selected "Amy Vandross." In some embodiments, the account owner is a field value (of a given record) within a table of the database. For example, "Amy Vandross" is the value of an "account owner" field for a given record of the "accounts" database table. In this example, the user may change the field value "Amy Vandross" for which the database search is performed.

Although disclosed techniques refer to databases and search queries generated to obtain content from such databases, these examples are not intended to be limiting and the disclosed techniques may be implemented with respect to various other types of data stores or storage systems, in other embodiments. For example, searches may be generated based on classifications of user searches generated by classification engine 142 and these searches may be used to obtain information from any form of repository that persistently stores a collection of data. Note that such storage systems may be distributed across various systems and are not limited to a single location or system. As such, the classification engine 142 may be implemented by systems other than server system 110, such as a user device, a browser, a cloud computing system, or any of various other systems that may interface with different types of data stores.

Example Method

Figure 9:
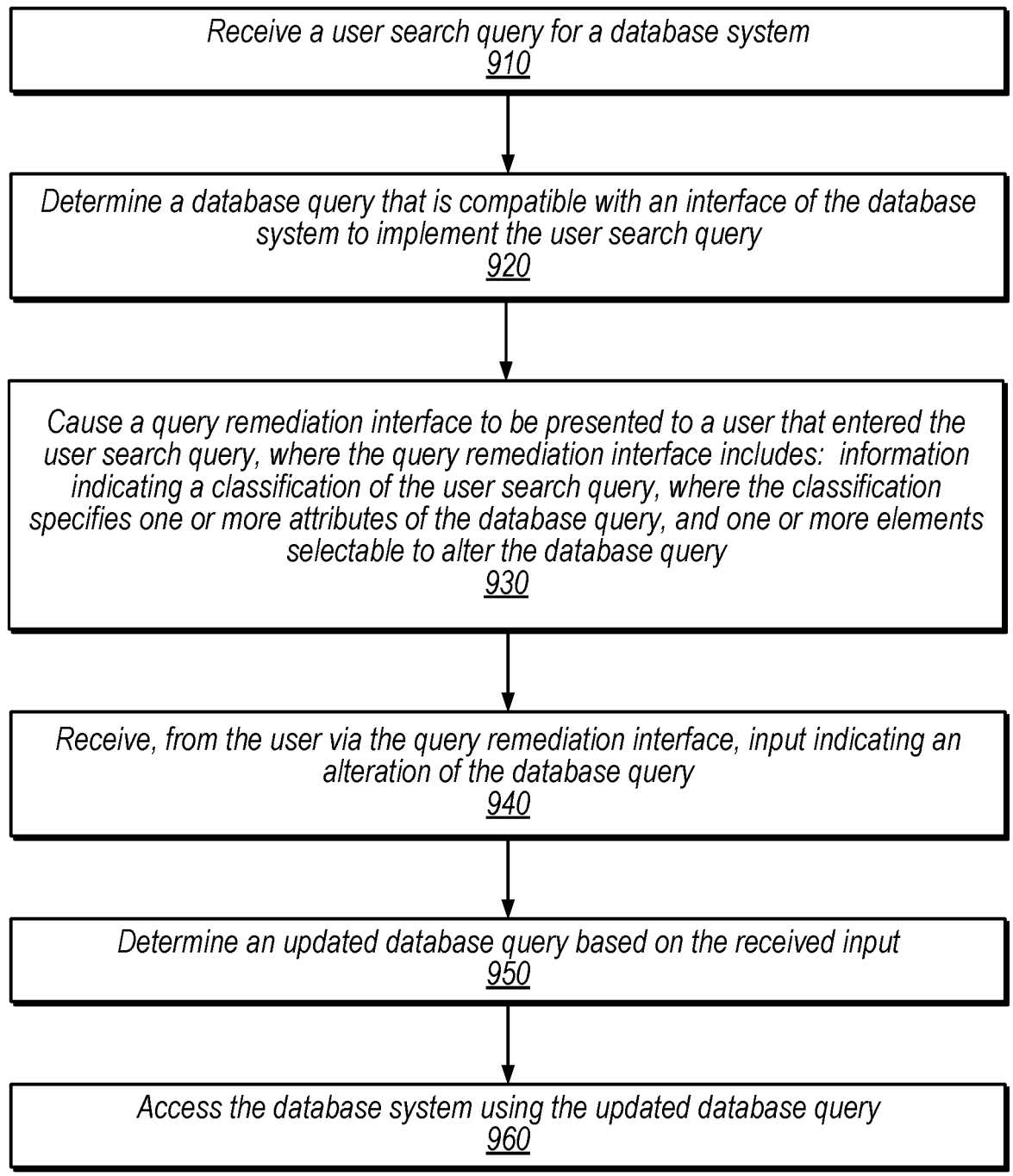
FIG. 9 is a flow diagram illustrating a method for allowing user remediation of a database query generated based on a user search query by presenting a query remediation interface to the user that entered the user search query, according to some embodiments.

Turning now to FIG. 9, a flow diagram illustrating a method for allowing user remediation of a database query generated based on a user search query by presenting a query remediation interface to the user that entered the user search query, according to some embodiments. The method shown in FIG. 9 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 910, in the illustrated embodiment, a computing system receives a user search query for a database system.

At 920, the computing system determines, based on the user search query, a database query that is compatible with an interface of the database system to implement the user search query. In some embodiments, the database system is a multi-tenant database system and determining the database query is further based on contextual information specifying that the user is associated with a particular tenant within the multi-tenant database system. The contextual information may specify a particular organization the user is associated with and the database query may be determined based on this information. For example, the user may have access to information of the particular organization that is stored in the database, but may not have access to other organizations' information that is also stored in the database. Further in this example, the information that the user has access to may affect classification of the user search query (e.g., as a natural language query or a keyword query).

At 930, the computing system causes a query remediation interface to be presented to a user that entered the user search query. In some embodiments, the query remediation interface includes: information indicating a classification of the user search query, where the classification specifies one or more attributes of the database query. In some embodiments, the computing system identifies one or more typographical errors in the user search query. In some embodiments, the computing system corrects the one or more typographical errors identified in the user search query, where the classification of the user search query further specifies the corrected typographical errors and the one or more elements are further selectable to alter the corrected typographical errors. For example, the user may have purposefully included the one or more terms that the system has identified as typographical errors or may want to change the corrected typographical errors in some way.

In some embodiments, the classification of the user search query is generated based on a tagging process that includes tagging a first set of one or more terms in the user search query according to a set of tagging criteria, where the set of tagging criteria includes a first criterion that is based on whether one or more terms in the user search query identify an object defined in a schema of a database of the database system. For example, the computing system may tag a query term as a table, based on identifying a table defined in the schema of the database that matches the query term.

In some embodiments, the query remediation interface includes a plurality of classifications of the user search query, where each of the plurality of classifications includes a preview of search results for the user search query generated based on their respective classifications. For example, the computing system may generate four different classifications for the user search query and may display four different sets of search results generated based on the four different classifications. In this example, the user may select one of the four sets of search results and may be shown additional search results that correspond to the selected set. In some embodiments, the set of tagging criteria further includes a second criterion that is based on whether one or more terms in the user search query are within a specified vocabulary indicative of a natural language query. In some embodiments, the set of tagging criteria further includes a third criterion that is based on whether one or more terms in the user search query are recognized modifiers for other terms of the user search query, including terms that have been tagged as identifying an object defined in a schema of the database. For example, for the search query "what are my closed accounts for 2019," the term "closed" may be tagged as a modifier of the term "accounts" which has been tagged as an object. In some embodiments, one of the terms in the user search query that is a recognized modifier specifies a date range.

In some embodiments, the information indicating a classification of the user search query includes, in response to the tagging process being unable to tag a second set of one or more terms in the user search query, a message specifying that the first set of terms were used to generate the database query and that the second set of terms were not able to be tagged. In some embodiments, the tagging process includes assigning a first type of tag to one or more terms of the user search query that are within a specified vocabulary indicative of a natural language query, where determining to present at least one remediation option to the user is based on a number of terms in the user search query assigned the first type of tag. For example, if the computing system tags two or more query terms as matching a vocabulary indicative of a natural language query, the system may display two or more remediation options to the user.

In some embodiments, the query remediation interface includes: one or more elements selectable to alter the database query. In some embodiments, the query remediation interface includes at least one remediation option. In some embodiments, the at least one remediation option is generated based on contextual information that is independent of the user search query, where the contextual information includes a classification history for user search queries previously entered by the user. For example, if the system classifies a user query as a natural language query, but the classification history for this user indicates that 80%, 90%, or 100% of the queries entered by this user have been classified as keyword queries, the system may provide remediation options that indicate to implement the user search query as a keyword query. In some embodiments, the one or more elements that are selectable to alter how the database is accessed are further selectable to alter whether the user search query is implemented as a natural language query or a keyword query. In some embodiments, the one or more elements that are selectable to alter how the database is accessed are further selectable to alter elements of a database query used for accessing the database. For example, the user may alter field values searched on or one or more conditions included in an SQL query used to query the database.

In some embodiments, the at least one remediation option specifies: an indication of one or more terms of the user search query that are untagged and an indication of one or more tagged terms of the user search query used to implement the user search query. The user may remediate the query by specifying tags for the one or more terms of the user search query that are untagged. In some embodiments, a first remediation option allows a user to alter the user search query and a second remediation option allows the user to alter a database query that specifies how the database is accessed to implement the user search query. For example, the user may change a term included in the user search query and may also change a condition included in an SQL statement used to query the database. In some embodiments, the one or more elements that are selectable to alter the database query are selectable to alter one or more terms of the user search query that are recognized modifiers for other terms of the user search query, including terms that have been tagged as identifying an object defined in a schema of a database of the database system.

At 940, the computing system receives, from the user via the query remediation interface, input indicating an alteration of the database query. In some embodiments, the user search query includes a particular term, where determining the database query includes adding a first restriction to the particular term. In some embodiments, the one or more elements further selectable to receive remediation input indicating one or more alternative restrictions of the particular term for the updated database query. For example, the user search query may be "What are the closed accounts for Christian?" and the computing system may add a restriction to Christian by performing a database query that specifies Christian Posse. In some embodiments, the query remediation interface includes a plurality of classifications of the user search query, where a number of the plurality of classifications is based on a number of unrecognized terms in the user search query. For example, if a user search query includes six terms and the computer system is able to tag only two of the terms, the query remediation interface may include four different classifications of the user search query.

At 950, the computing system determines an updated database query based on the received input.

At 960, the computing system accesses the database system using the updated database query.

In some embodiments, classifying natural language queries and providing remediation options for the natural language queries may advantageously reduce the number of selections a user makes before obtaining desired information, such as a report. In some embodiments, classifying a query as a natural language query and providing results for the classified query may reduce or remove the need to generate static reports, such as daily sales reports, for example. In some embodiments, allowing a user to remediate a database query, their search query, or classification for their search query may improve user interaction, by providing desired results in less time relative to traditional techniques.

Example Computing Device

Figure 10:
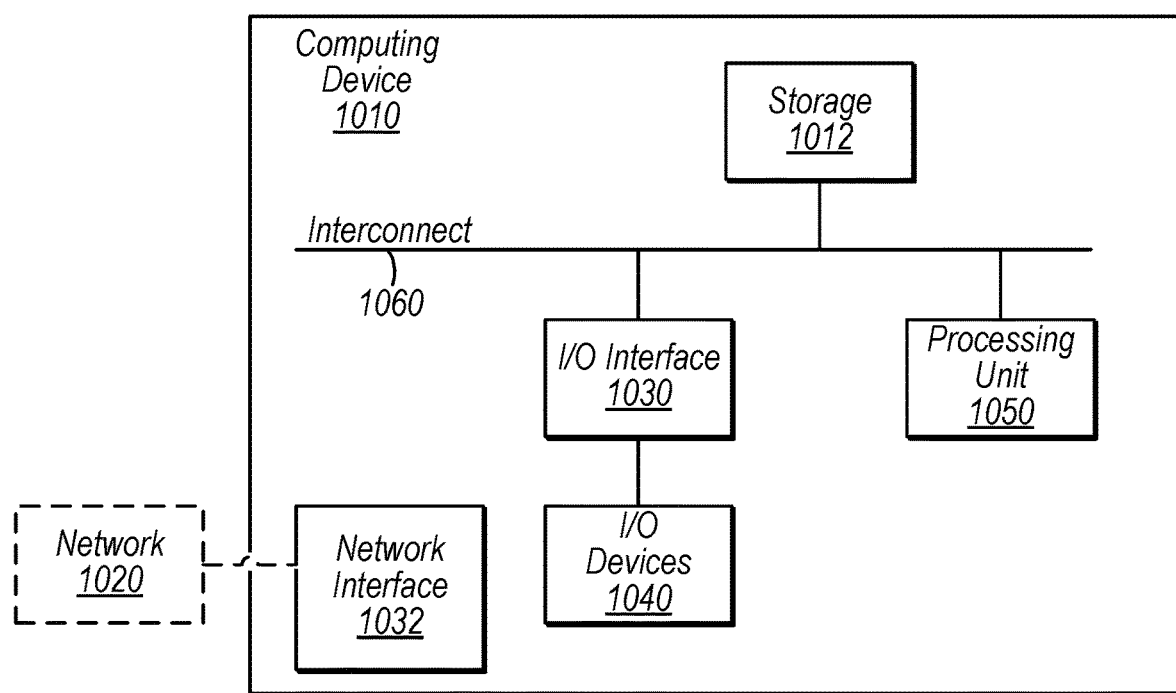
FIG. 10 is a block diagram illustrating an example computing device, according to some embodiments.

Turning now to FIG. 10, a block diagram of a computing device (which may also be referred to as a computing system) 1010 is depicted, according to some embodiments. Computing device 1010 may be used to implement various portions of this disclosure. Computing device 1010 is one example of a device that may be used as a mobile device, a server computer system, a client computer system, or any other computing system implementing portions of this disclosure.

Computing device 1010 may be any suitable type of device, including, but not limited to, a personal computer system, desktop computer, laptop or notebook computer, mobile phone, mainframe computer system, web server, workstation, or network computer. As shown, computing device 1010 includes processing unit 1050, storage subsystem 1012, and input/output (I/O) interface 1030 coupled via interconnect 1060 (e.g., a system bus). I/O interface 1030 may be coupled to one or more I/O devices 1040. Computing device 1010 further includes network interface 1032, which may be coupled to network 1020 for communications with, for example, other computing devices.

Processing unit 1050 includes one or more processors and, in some embodiments, includes one or more coprocessor units. In some embodiments, multiple instances of processing unit 1050 may be coupled to interconnect 1060. Processing unit 1050 (or each processor within processing unit 1050) may contain a cache or other form of on-board memory. In some embodiments, processing unit 1050 may be implemented as a general-purpose processing unit, and in other embodiments it may be implemented as a special purpose processing unit (e.g., an ASIC). In general, computing device 1010 is not limited to any particular type of processing unit or processor subsystem.

As used herein, the terms "processing unit" or "processing element" refer to circuitry configured to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like.

Storage subsystem 1012 is usable by processing unit 1050 (e.g., to store instructions executable by and data used by processing unit 1050). Storage subsystem 1012 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 1012 may consist solely of volatile memory in some embodiments. Storage subsystem 1012 may store program instructions executable by computing device 1010 using processing unit 1050, including program instructions executable to cause computing device 1010 to implement the various techniques disclosed herein.

I/O interface 1030 may represent one or more interfaces and may be any of various types of interfaces configured to couple to and communicate with other devices, according to various embodiments. In some embodiments, I/O interface 1030 is a bridge chip from a front-side to one or more back-side buses. I/O interface 1030 may be coupled to one or more I/O devices 1040 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

It is noted that the computing device of FIG. 10 is one embodiment for demonstrating disclosed concepts. In other embodiments, various aspects of the computing device may be different. For example, in some embodiments, additional components, or multiple instances of the illustrated components may be included.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable medium having program instructions stored thereon that are capable of causing a computer system to implement operations comprising:
  receiving a user search query for a database system;
  tagging one or more terms of the user search query, wherein the tagging includes assigning a first type of tag to one or more terms of the user search query that are within a specified vocabulary indicative of a natural language query;
  determining, based on the tagging, a classification for the user search query;
  generating, based on the user search query and the classification for the user search query, a database query that is compatible with an interface of the database system to implement the user search query;
  causing a query remediation interface to be presented to a user that entered the user search query, wherein the query remediation interface includes:
    information indicating the classification for the user search query, wherein the classification specifies one or more attributes of the database query;

one or more elements selectable to alter the database query, wherein one of the elements is selectable to alter whether the user search query is implemented as a natural language query or a keyword query, and wherein the one or more elements are determined based on a number of terms in the user search query assigned the first type of tag;

receiving, from the user via the query remediation interface, input indicating an alteration of the database query;

generating an updated database query based on the received input; and accessing the database system using the updated database query.

2. The non-transitory computer-readable medium of claim 1, wherein the database system is a multi-tenant database system and wherein the determining the database query is further based on contextual information specifying that the user is associated with a particular tenant within the multi-tenant database system.

3. The non-transitory computer-readable medium of claim 1, wherein the operations further comprise:

identifying one or more typographical errors in the user search query; and correcting the one or more typographical errors identified in the user search query, wherein the classification of the user search query further specifies the corrected typographical errors and wherein the one or more elements are further selectable to alter the corrected typographical errors.

4. The non-transitory computer-readable medium of claim 1, wherein the tags used to generate the classification of the user search query are automatically generated based on a tagging process that includes tagging a first set of one or more terms in the user search query according to a set of tagging criteria, wherein the set of tagging criteria includes a first criterion that is based on whether one or more terms in the user search query identify an object defined in a schema of a database of the database system.

5. The non-transitory computer-readable medium of claim 4, wherein the set of tagging criteria further includes a second criterion that is based on whether one or more terms in the user search query are within a specified vocabulary indicative of a natural language query.

6. The non-transitory computer-readable medium of claim 5, wherein the set of tagging criteria further includes a third criterion that is based on whether one or more terms in the user search query are recognized modifiers for other terms of the user search query, including terms that have been tagged as identifying an object defined in a schema of the database.

7. The non-transitory computer-readable medium of claim 6, wherein one of the terms in the user search query that is a recognized modifier specifies a date range.

8. The non-transitory computer-readable medium of claim 4, wherein the information indicating a classification of the user search query includes, in response to the tagging process being unable to tag a second set of one or more terms in the user search query, a message specifying that the first set of terms were used to generate the database query and that the second set of terms were not able to be tagged.

9. A method, comprising:

receiving, by a computing system from a user, a user search query for a database;

tagging, by the computing system, one or more terms of the user search query, wherein the tagging includes:

assigning a tag to a first term of the user search query that identifies an object defined in a schema of the database; and assigning a first type of tag to one or more terms of the user search query that are within a specified vocabulary indicative of a natural language query; and determining, based on the tagging, a classification for the user search query;

determining, by the computing system based on a number of terms in the user search query assigned the first type of tag, to present at least one remediation option to the user, wherein the presenting includes:

the classification for the user search query; and one or more elements that are selectable to alter how the database is accessed to implement the user search query, including altering whether the user search query is implemented as a natural language query or a keyword query;

receiving input, by the computing system from the user, for the at least one remediation option; and accessing, by the computing system, the database based on the received input.

10. The method of claim 9, wherein the at least one remediation option is generated based on contextual information that is independent of the user search query and wherein the contextual information includes a classification history for user search queries previously entered by the user.

11. The method of claim 9, wherein the one or more elements that are selectable to alter how the database is accessed are further selectable to alter elements of a database query used for accessing the database.

12. The method of claim 9, wherein the at least one remediation option specifies:

an indication of one or more terms of the user search query that are untagged; and an indication of one or more tagged terms of the user search query used to implement the user search query.

13. The method of claim 9, wherein a first remediation option allows a user to alter the user search query and a second remediation option allows the user to alter a database query that specifies how the database is accessed to implement the user search query.

14. The method of claim 9, wherein the presenting includes a plurality of classifications of the user search query and wherein each of the plurality of classifications includes a preview of search results for the user search query generated based on their respective classifications.

15. A non-transitory computer-readable medium having program instructions stored thereon that are capable of causing a computer system to implement operations comprising:

receiving a user search query for a database system;

tagging one or more terms of the user search query, wherein the tagging includes assigning a first type of tag to one or more terms of the user search query that are within a specified vocabulary indicative of a natural language query;

determining, based on the tagging, a classification for the user search query;

generating, based on the user search query and contextual information that is independent of the user search query and the classification for the user search query, a database query that is compatible with an interface of the database system to implement the user search query;

causing a query remediation interface to be presented to the user that entered the user search query, wherein the query remediation interface includes:
  information indicating the classification for the user search query, wherein the classification specifies whether the user search query was implemented as a natural language query or a keyword query, and wherein the classification specifies one or more attributes of the database query;
  one or more elements selectable to receive remediation input relating to the classification of the user search query, wherein one of the elements is selectable to alter whether the user search query is implemented as a natural language query or a keyword query, and wherein the one or more elements are determined based on a number of terms in the user search query assigned the first type of tag;
receiving, from the user via the query remediation interface, the remediation input;
generating an updated database query based on the remediation input; and
accessing the database system using the updated database query.

16. The non-transitory computer-readable medium of claim 15, wherein the one or more elements that are selectable to alter the database query are selectable to alter one or more terms of the user search query that are recognized modifiers for other terms of the user search query, including terms that have been tagged as identifying an object defined in a schema of a database of the database system.

17. The non-transitory computer-readable medium of claim 15, wherein the user search query includes a particular term, wherein determining the database query includes adding a first restriction to the particular term, and wherein one or more elements are further selectable to receive remediation input indicating one or more alternative restrictions of the particular term for the updated database query.

18. The non-transitory computer-readable medium of claim 15, wherein the query remediation interface includes a plurality of classifications of the user search query, wherein a number of the plurality of classifications is based on a number of unrecognized terms in the user search query.

19. The non-transitory computer-readable medium of claim 1, wherein the query remediation interface further includes a plurality of classifications of the user search query, and wherein each of the plurality of classifications includes a preview of search results for the user search query generated based on their respective classifications.

20. The method of claim 9, wherein the computing system is a multi-tenant database system and wherein accessing the database is further based on contextual information specifying that the user is associated with a particular tenant within the multi-tenant database system.

* * * * *